United States Patent [19]

Leopold et al.

[11] Patent Number: 5,452,471
[45] Date of Patent: Sep. 19, 1995

[54] NETWORK OF HIERARCHICAL COMMUNICATION SYSTEMS AND METHOD THEREFOR

[75] Inventors: Raymond J. Leopold, Tempe; Gregory B. Vatt, Mesa, both of Ariz.; William F. Zancho, Hawthorn Woods, Ill.

[73] Assignee: Motorola, Inc., Schaumburg, Ill.

[21] Appl. No.: 237,422

[22] Filed: May 2, 1994

Related U.S. Application Data

[63] Continuation of Ser. No. 974,749, Nov. 12, 1992, abandoned.

[51] Int. Cl.⁶ .................... H04B 7/26; H04B 7/185; H04Q 7/38
[52] U.S. Cl. .................... 455/12.1; 455/13.2; 455/33.1; 455/33.4; 455/34.2; 455/62; 455/63; 379/59
[58] Field of Search .................... 455/12.1, 13.2, 13.4, 455/33.1, 33.2, 33.3, 62, 63, 54.1, 67.1, 34.1, 34.2, 33.4, 89, 56.1; 379/59

[56] References Cited

U.S. PATENT DOCUMENTS

| 4,144,411 | 3/1979 | Frenkiel | 455/33.3 |
| 4,644,347 | 2/1987 | Lucas et al. | 455/54.1 |
| 4,754,453 | 6/1988 | Eizenhofer | 370/95 |
| 4,763,322 | 8/1988 | Eizenhofer | 370/95 |
| 4,799,252 | 1/1989 | Eizenhoffer et al. | 379/59 |
| 4,949,395 | 8/1990 | Rydbeck | 455/33 |
| 5,010,317 | 4/1991 | Schwendeman et al. | 455/12.1 |
| 5,073,900 | 12/1991 | Mallinckrodt | 375/1 |
| 5,142,691 | 8/1992 | Freeburg et al. | 455/63 |
| 5,161,248 | 11/1992 | Bertinger et al. | 455/12.1 |
| 5,235,632 | 8/1993 | Raith | 455/33.4 |
| 5,274,845 | 12/1993 | Wang | 455/54.1 |
| 5,287,545 | 2/1994 | Kallin | 455/33.1 |
| 5,301,359 | 4/1994 | Van den Heuvel et al. | 455/33.1 |
| 5,327,572 | 7/1994 | Freeburg | 455/33.1 |

FOREIGN PATENT DOCUMENTS

| 0143725 | 6/1990 | Japan | 455/33.1 |
| 9004293 | 4/1990 | WIPO | 455/54.1 |

OTHER PUBLICATIONS

Rafferty, W., "RF Development for Mobile-Satellite Systems", Nov. 1988, MSN & CT, pp. 28-37, Table 1.

Primary Examiner—Chi H. Pham
Assistant Examiner—Mark D. Wisler
Attorney, Agent, or Firm—Gregory J. Gorrie; Robert M. Handy

[57] ABSTRACT

A hierarchical communication network includes primary, secondary, and tertiary communication systems. The primary system uses orbiting satellites as communication nodes and forms a pattern of cells that may cover the entire earth and that move over the earth. A given spectrum is divided among the cells in accordance with a reuse plan. Any number of secondary, terrestrial-based systems have secondary region areas of coverage that are substantially smaller than the distance to the orbits of the satellites used by the primary system. Secondary systems monitor the primary system to determine which channels of the spectrum are available for use in their secondary regions. Any number of tertiary, terrestrial-based systems reside within a secondary region and have tertiary region areas of coverage that are substantially confined within buildings. Tertiary systems use channels concurrently used by the primary system in the same area where their tertiary regions are located.

37 Claims, 11 Drawing Sheets

NETWORK OF HIERARCHICAL COMMUNICATION SYSTEMS AND METHOD THEREFOR

This application is a continuation of prior application Ser. No. 07/974,749, filed Nov. 12, 1992, now abandoned.

TECHNICAL FIELD OF THE INVENTION

The present invention relates generally to radio telecommunications. More specifically, the present invention relates to radio telecommunication systems which reuse spectrum in accordance with a cellular reuse plan.

BACKGROUND OF THE INVENTION

Communication systems almost always have a goal of efficiently using the electromagnetic spectrum allocated to them. In order to satisfy this goal, communication systems limit the opportunities for interference. Signals with significantly different frequency or timing parameters do not interfere and may easily be distinguished from one another. Likewise, a strong signal may be distinguished from a relatively weak signal having similar frequency and timing parameters. However, when generally equal strength signals having similar parameters are present, interference is possible. To reduce the likelihood of interference, a communication system often employs constraints which prevent the simultaneous presence of two substantially equal strength signals having substantially the same frequency within the system's area of coverage.

Cellular communication systems have been devised to efficiently use a given spectrum. In conventional cellular systems, an area of coverage is divided into cells. Communication signals are intended to be transmitted and received within the confines of a single cell. Thus, transmission power levels are adjusted as low as possible while still insuring reliable reception within the cell. Adjacent cells are typically assigned different sections of the given spectrum so that no interference occurs between communications in adjacent cells. However, cells that are not adjacent to one another may reuse the same spectrum. Transmission power levels are sufficiently low so that no significant interference problem exists between communications taking place in non-adjacent cells.

A characteristic of cellular systems is that the amount of communication traffic which may be carried by a given spectrum increases as cell size decreases because transmission power decreases correspondingly. As transmission power decreases, the amount of reuse possible for a given spectrum in a given area increases. Thus, it is desirable to have cell sizes as small as possible where communication traffic is great.

On the other hand, larger cell sizes are more desirable where communication traffic is small or where areas of coverage are large. Larger cells provide communication services over greater distances. Likewise, the costs of installing, operating, and maintaining the equipment needed to support only a few large cells are less than the costs for installing, operating, and maintaining many small cells. Furthermore, as subscriber units move relative to cells, the quantity of overhead communications required to handoff calls from one cell to another decreases dramatically with increasing cell sizes.

SUMMARY OF THE INVENTION

Accordingly, it is an advantage of the present invention that an improved communication system is provided.

Another advantage of the present invention is that a small cell communication system is provided which operates in cooperation with a large cell communication system.

Yet another advantage is that the present invention provides a large cell communication system which has a vast area of coverage in addition to any number of independent small cell communication systems that reside within the area of coverage for the large cell system and that utilize the same spectrum as is allocated to the large cell system.

Another advantage is that the present invention provides a network of communication systems that together carry an extremely large amount of communication traffic and cover an extremely large area.

Another advantage is that the present invention provides a hierarchical network of communication systems which are compatible with one another so that a single subscriber unit may communicate with any of the systems within the network.

The above and other advantages of the present invention are carried out in one form by a subordinate communication system that cooperates with a primary communication system. The primary communication system projects a plurality of cells over the earth, allocates orthogonal channels of a spectrum in adjacent ones of the cells, and reuses channels in geographically spaced apart cells. The subordinate communication system includes an antenna that projects a secondary region over the earth. This antenna is located so that the secondary region and a local one of the cells occupy a common area. Means are included for receiving allocation data from the primary communication system. These allocation data identify channels allocated by the primary system for use in the local cell. In addition, means are included for selecting channels of the spectrum that are available for use in the secondary region. This selecting means is responsive to the allocation data.

The above and other advantages of the present invention are carried out in another form by a method of operating a subscriber unit in accordance with a hierarchical network of communication systems wherein primary and secondary systems have common areas of coverage. The primary system has a larger area of coverage than the secondary system. The method calls for receiving first and second acquisition signals. First and second identity data are obtained from the first and second acquisition signals, respectively. These identity data indicate whether the respective acquisition signal was broadcast from the primary system or the secondary system. The subscriber unit refrains from communicating with the primary system when the first and second identity data indicate that the first and second acquisition signals were broadcast from the primary and secondary systems, respectively.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

The description presented below is linked to the Figures through the use of reference numbers. These reference numbers are chosen to reflect the number of the Figure in which the referenced items may be best observed. In particular, the most significant digit of all three-digit reference numbers and the most significant two digits of all four-digit reference numbers equal the number of a Figure in which that referenced feature may be viewed.

DETAILED DESCRIPTION OF THE PREFERRED EMBODIMENTS

Figure 1:
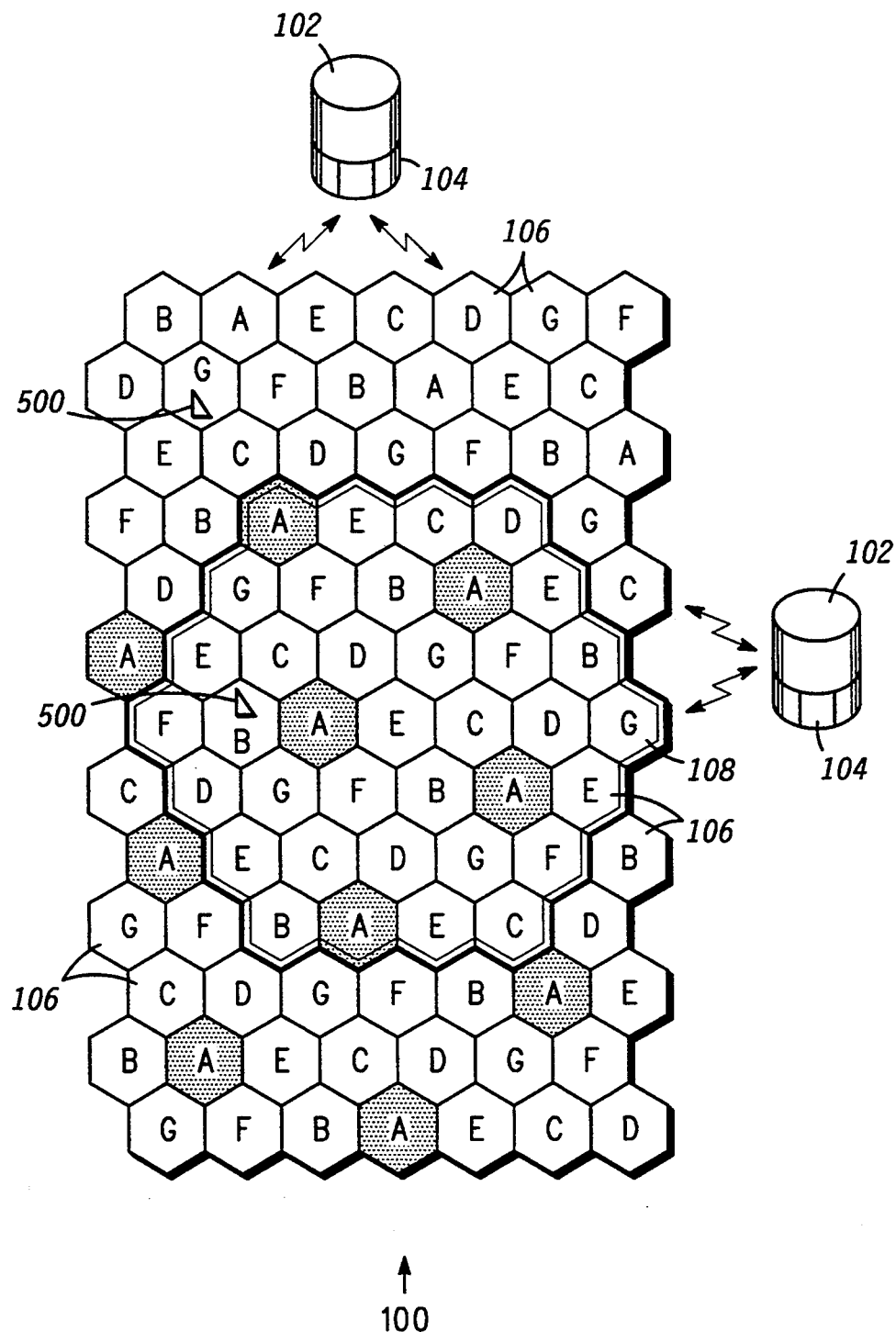
FIG. 1 shows a layout diagram of a cellular pattern produced by a primary communication system.

Referring to FIG. 1, a communication network constructed in accordance with the preferred embodiments of the present invention includes a primary communication system 100 and one or more subordinate communication systems (discussed below). Primary system 100 may, for example, be a space-based cellular communication system. Thus, system 100 may use numerous satellites 102 orbiting the earth. Each satellite 102 includes an array 104 of directional antennas. Each array 104 projects numerous discrete antenna patterns on the earth's surface at numerous diverse angles away from its satellite 102. FIG. 1 shows a diagram of a resulting pattern of geographically spaced apart cells 106 that satellites 102 collectively form over the earth. A region 108, which is bounded by a double line in FIG. 1, results from the antenna patterns produced by an antenna array 104 of a single satellite 102. Cells 106 which reside outside of region 108 are produced by antenna arrays 104 from other satellites 102. With sixty-six of satellites 102 distributed around the earth in orbits approximately 765 km above the earth, the entire surface of the earth, including the atmosphere near the surface of the earth, represents the area of coverage for primary system 100.

When satellites 102 are located in orbits around 765 km above the earth, they travel with respect to the earth at speeds of up to 26,000 km/hr. Electromagnetic communications which substantially follow a line of sight define region 108 to be approximately 4075 km in diameter. The precise number and the precise size of cells 106 projected within a single region 108 are not important parameters in the present invention. Nevertheless, the diameter of any single cell 106 is expected to be in the 400-800 km range in the preferred embodiments. Since satellites 102 travel at speeds of up to 26,000 km/hr with respect to the earth, cells 106 also travel over the earth at close to this speed. At this speed, any given point on the surface of the earth resides within a single cell 106 for no more than around one minute and within a single satellite's region 108 for no more than around nine minutes.

For convenience, FIG. 1 illustrates cells 106 and region 108 as being discrete, generally hexagonal shapes without overlap or gaps. However, those skilled in the art will understand that, in actual practice, equal strength lines projected from antennas 104 may be more circular or elliptic than hexagonal, that antenna side lobes may distort the pattern, and that some preferably minor overlap between adjacent cells may be expected. Moreover, those skilled in the art will appreciate that the above-discussed preferred orbital geometry for primary system 100 need not be configured precisely as described. For example, the number and orbital characteristics of satellites 102 may be different than described above, or the communication nodes provided by satellites 102 may be located on or near the surface of the earth.

Primary system 100 communicates through a constellation of satellites 102 with any number, potentially in the millions, of subscriber units 500 using a limited amount of the electromagnetic spectrum. In the preferred embodiments of the present invention, the portion of the electromagnetic spectrum used by system 100 resides in the microwave range. Electromagnetic energy at these frequencies substantially propagates along a line of sight and may be substantially attenuated by placing barriers between transmitting and receiving antennas.

FIG. 1 illustrates an exemplary reuse plan which may be adopted by primary system 100. In particular, the entire region of the electromagnetic spectrum used by primary system 100 is divided into discrete portions, hereinafter referred to as channel sets. Desirably, each of these discrete channel sets is orthogonal to all other channel sets and each channel set may include any number of its own orthogonal channels. In other words, simultaneous communication may take place at a common location over every channel in every channel set without significant interference between any two channels.

The precise number of channel sets into which the spectrum is divided is not important to the present invention. FIG. 1 illustrates an exemplary allocation to cells 106 in accordance with a division of the spectrum into seven discrete channel sets. FIG. 1 references the seven discrete channel sets through the use of the characters "A", "B", "C", "D", "E", "F", and "G". Those skilled in the art will appreciate that a different number of channel sets may be used and that, if a different number is used, the resulting assignment of channel sets to cells 106 will differ from the assignment pattern depicted in FIG. 1. Likewise, those skilled in the art will appreciate that each channel set may include one channel or any number of orthogonal channels therein. As a result of allocating channel sets in accordance with a reuse plan, such as that illustrated in FIG. 1, adjacent cells 106 use only channels which are orthogonal to each other, and co-channel cells, which reuse the same spectrum, are geographically spaced apart so that they are not adjacent to one another.

As is conventional with cellular communication systems, when a subscriber unit 500 or other terrestrial station (not shown) approaches a cell boundary, the station is passed off to another cell. However, in the preferred embodiments of the present invention such stations approach cell boundaries primarily due to the movement of cells 106. Nothing requires terrestrial stations to be stationary, but as a general rule objects on or near the surface of the earth move at speeds much less than the speed with which cells 106 move. The passing off process requires the station to continue any on-going communications using a different portion of the spectrum than it was previously using. In other words, the station must switch the channel(s) over which it is communicating to use a channel from the channel set allocated to the cell 106 within which the station currently resides. Passing off within primary system 100 may require the station to communicate with an entirely different satellite.

Figure 2:
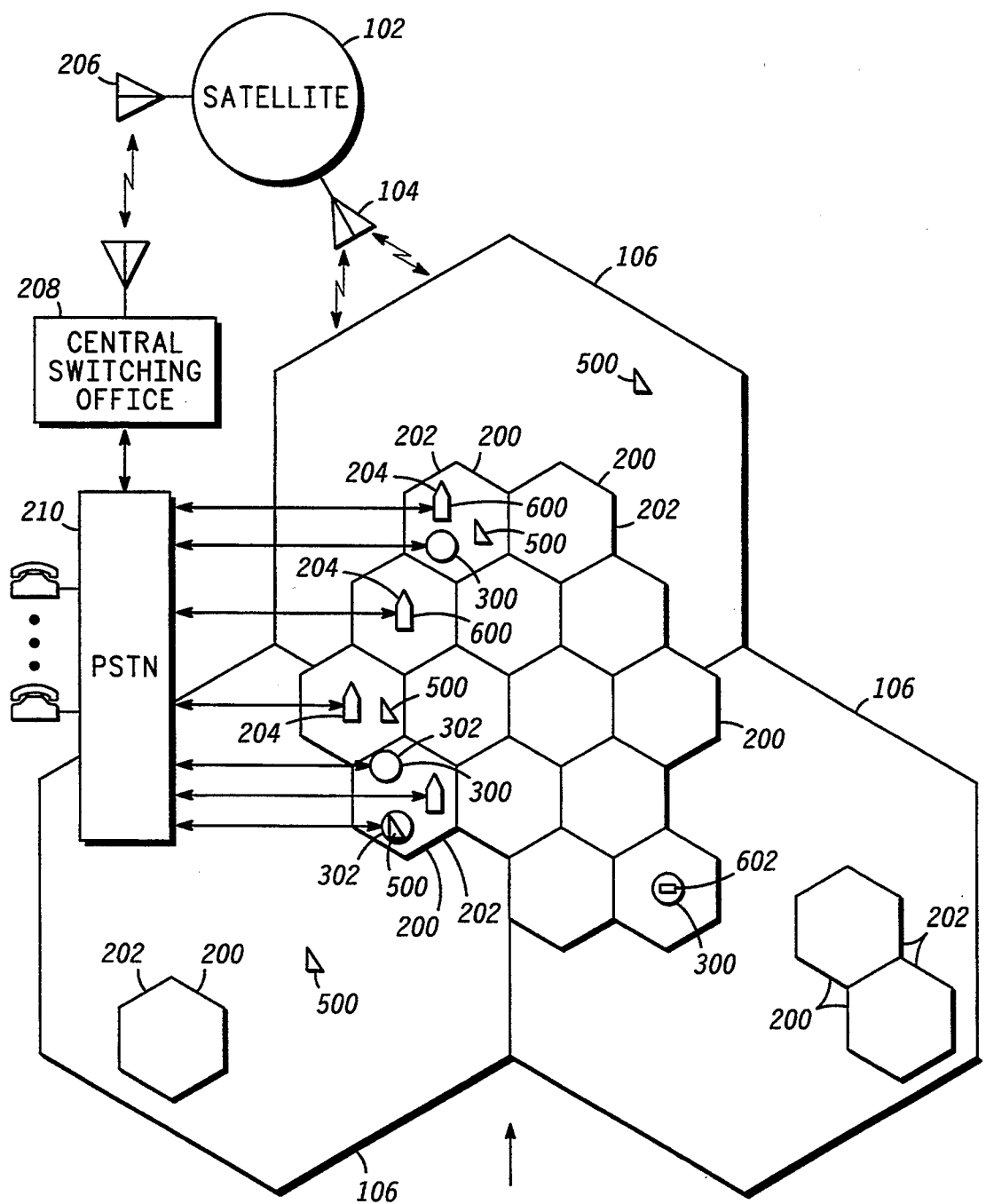
FIG. 2 shows a layout diagram of a plurality of secondary communication regions which are overlaid on a few cells from FIG. 1.

FIG. 2 shows exemplary subordinate communication systems and their respective areas of coverage superimposed on three arbitrarily selected cells 106 from primary system 100. In particular, FIG. 2 illustrates a plurality of secondary communication systems 200 and a plurality of tertiary communication systems 300. Each secondary system 200 operates within its own secondary region 202, and each tertiary system 300 operates within its own tertiary region 302. FIG. 2 exaggerates the sizes of preferred secondary regions 202 and tertiary regions 302 relative to cells 106 for clarity. Each tertiary region 302 occupies a common area with one of secondary regions 202. Each secondary region 202 occupies a common area with a cell 106. Preferably, different tertiary regions 302 occupy different areas and different secondary regions 202 occupy different areas.

In the preferred embodiments of the present invention, secondary regions 202 and tertiary regions 302 are terrestrial based, stationary systems. In other words, base station antennas (discussed below) with which subscriber units 500 communicate are preferably located at stationary locations near the surface of the earth. Thus, they may be adapted to relatively permanent terrestrial fixtures, such as cities and buildings. Since cells 106 in the preferred embodiment of primary system 100 move, the particular cells 106 which occupy common areas with secondary regions 202 and tertiary regions 302 and data describing these cells' identities constantly change in response to this movement.

Each secondary system 200 includes a secondary system controller 600. Secondary controller 600 resides at a monitoring location 204 within each secondary region 202. However, FIG. 2 shows only a few of controllers 600 within secondary regions 202 for clarity. Generally speaking, secondary controller 600 monitors primary system 100 from location 204 to identify a local cell 106 within which monitoring location 204 then currently resides and to determine a channel set allocated to that local cell. Once a local cell's channel set is known, secondary controller 600 may conduct communications using channels that are used by primary system 100 in cells 106 other than the current local cell.

Such secondary system communications will not cause significant interference at satellites 102 due to a combination of two factors. First, the channels used for secondary communications are orthogonal to channels used for primary communications in the local cell. Second, secondary communications are conducted at a relatively low power level so that, by the time secondary communication signals propagate to a satellite 102, they are greatly attenuated relative to primary communication signals.

A consequence of the low power level used for secondary communications is that all points within secondary region 202 are proximate monitoring location 204. Preferably, the power levels of signals transmitted from an antenna of secondary controllers 600 are adjusted so that the radius of secondary regions 202 projected over the earth are significantly less, and more preferably at least an order of magnitude less, than the smallest possible distance to a satellite 102.

Generally speaking, secondary regions 202 are located in urban or other areas where communication traffic is expected to be high. In such areas, the small cell nature of secondary systems 200 accommodates a greater capacity of communication traffic than may be accommodated by primary system 100. Monitoring locations 204 are preferably spaced apart from one another so that secondary regions 202 do not experience significant overlap. However, regions 202 may be adjacent to one another, as may be required to provide complete secondary coverage over a large urban area. On the other hand, regions 202 need not be adjacent to one another, and single regions 202 or clusters of regions 202 may be positioned by themselves as needed to accommodate any level of communication traffic.

FIG. 2 also shows a block diagram which depicts the interconnection between primary system 100, secondary systems 200, and tertiary systems 300. Satellites 102, of which only one is shown in FIG. 2, include an antenna 206 through which they communicate with a nearby central switching office 208. Nothing requires such communication with central switching offices 208 to take place over the same portion of spectrum that is used for communicating with subscriber units 500. Preferably, a high capacity trunking communication link connects a satellite 102 and a central switching office 208. Central switching offices 208 are preferably located on the earth as needed to comply with geopolitical constraints. Central switching offices 208 couple to the public switched telecommunications network (PSTN) 210, which is available throughout the world and which also couples to millions of telecommunication instruments, computers, facsimile machines, and other devices. Likewise, each secondary system controller 600 and tertiary system controller 602 couples to PSTN 210. Through PSTN 210, switching office 208, secondary controller 600 and tertiary controller 602 may route call traffic or may communicate with each other.

The communication network which results from the hierarchy of primary system 100, secondary systems 200, and tertiary systems 300 provides a subscriber unit 500 with many communication options. When multiple communication systems are available to subscriber units 500, they preferably use the communication system with the smallest area of coverage because such systems accommodate the greatest communication traffic capacity per unit area, thereby freeing up communication trafficking capacities in systems with larger areas of coverage. If a subscriber unit 500 is located in a tertiary region 302, then it preferably uses the corresponding tertiary system 300 to communicate with any telecommunication device in the world or with any other subscriber unit 500. If a subscriber unit 500 is not located in a tertiary region 302 but is located in a secondary region 202, then it preferably uses the corresponding secondary system 200 to communicate with any telecommunication device in the world or with any other subscriber unit 500. And, if a subscriber unit 500 is not currently located in any tertiary region 302 or secondary region 202, then it preferably uses primary system 100 to communicate with any telecommunication device in the world or with any other subscriber unit 500.

Figure 3:
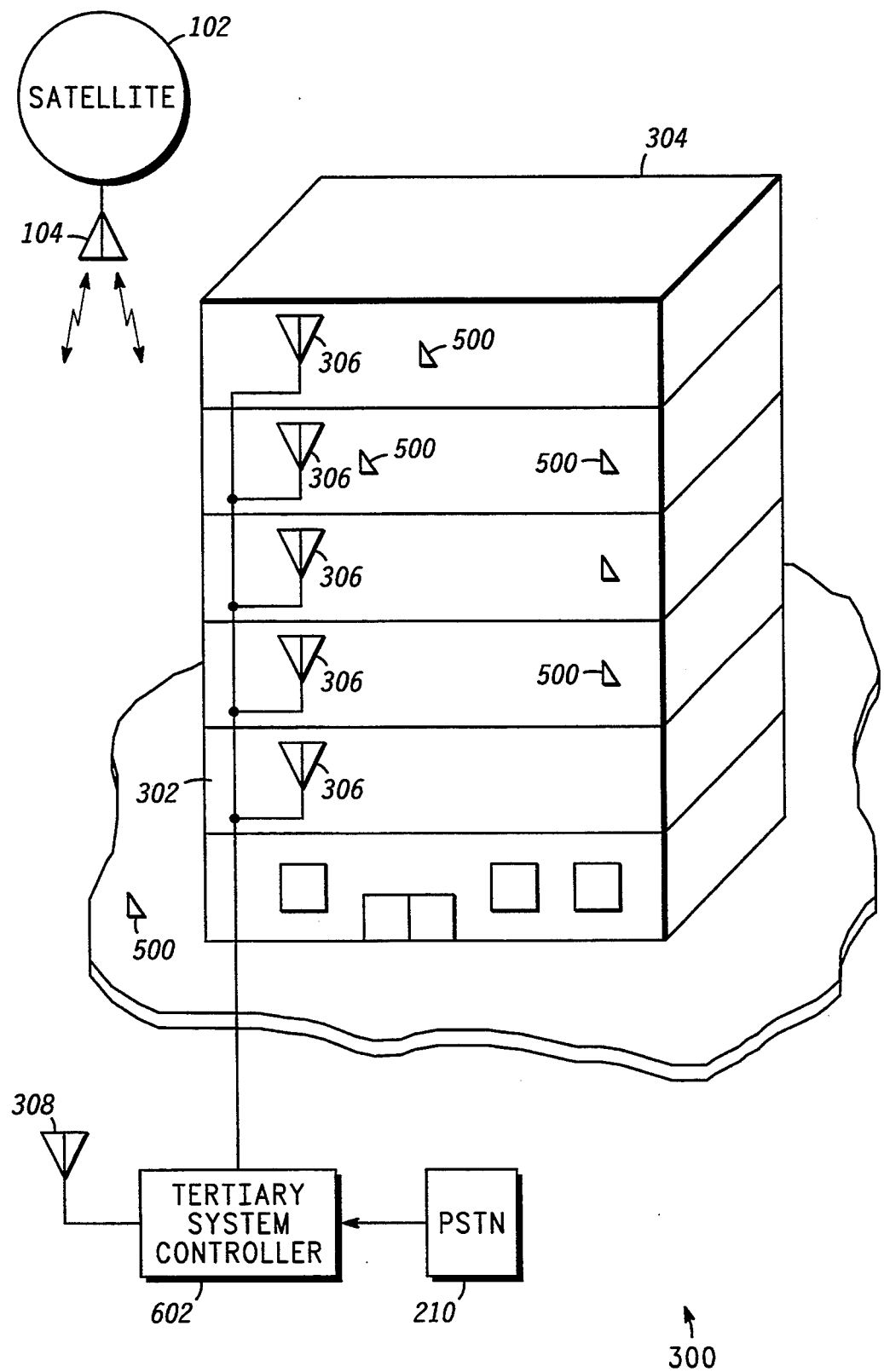
FIG. 3 shows a layout diagram of a tertiary communication region which resides in a secondary communication region from FIG. 2.

FIG. 3 shows a layout diagram of a tertiary communication region 302. Tertiary region 302 is preferably confined to a building 304 or other structure that provides a barrier which impedes the transverse propagation of the types of electromagnetic energy which are used in communicating with subscriber units 500. Tertiary region 302 is confined to building 304 by locating one or more antennas 306, through which tertiary system 300 communicates with subscriber units 500, inside building 304. Thus, all points within tertiary region 302 are an intimate distance, which is typically much smaller than the radius of a secondary region 202, from an antenna 306. The outer walls and roof of building 304 are placed between antennas 306 and antennas 104 of satellites 102.

Tertiary system 300 includes a tertiary system controller 602. Tertiary controller 602 couples to antennas 306 and serves as a base station which communicates with subscriber units 500 located within building 304. Tertiary system controller 602 engages in data communication with the secondary controller 600 (see FIG. 2) in whose secondary region 202 it resides. This data communication may take place through PSTN 210. Alternatively, tertiary controller 602 may be configured as a subscriber unit which resides within the jurisdiction of a secondary controller 600. In this alternative embodiment, an antenna 308 is located outside building 304 and data communication takes place through secondary communication system 200. In yet another alternative embodiment, tertiary controller 602 may be configured as a subscriber unit, and data communication may take place through primary system 100.

Tertiary system 300 is preferably configured as a very low power system which communicates using channels allocated to the current local cell of primary system 100. In other words, primary system 100 and tertiary system 300 use the same spectrum within the same cell 106. The low power nature of transmissions within tertiary system 300 prevents interference at satellite 102, and the attenuation provided by building 304, coupled with appropriate adjustment of power levels of transmissions from antennas 306, prevents interference at subscriber units 500 within building 304. Building 304 and region 302 may be located near subscriber units 500 which are communicating with secondary system 200. Tertiary system communications do not interfere with secondary system communications because secondary system 200 avoids using channels assigned to the local cell.

Figure 4:
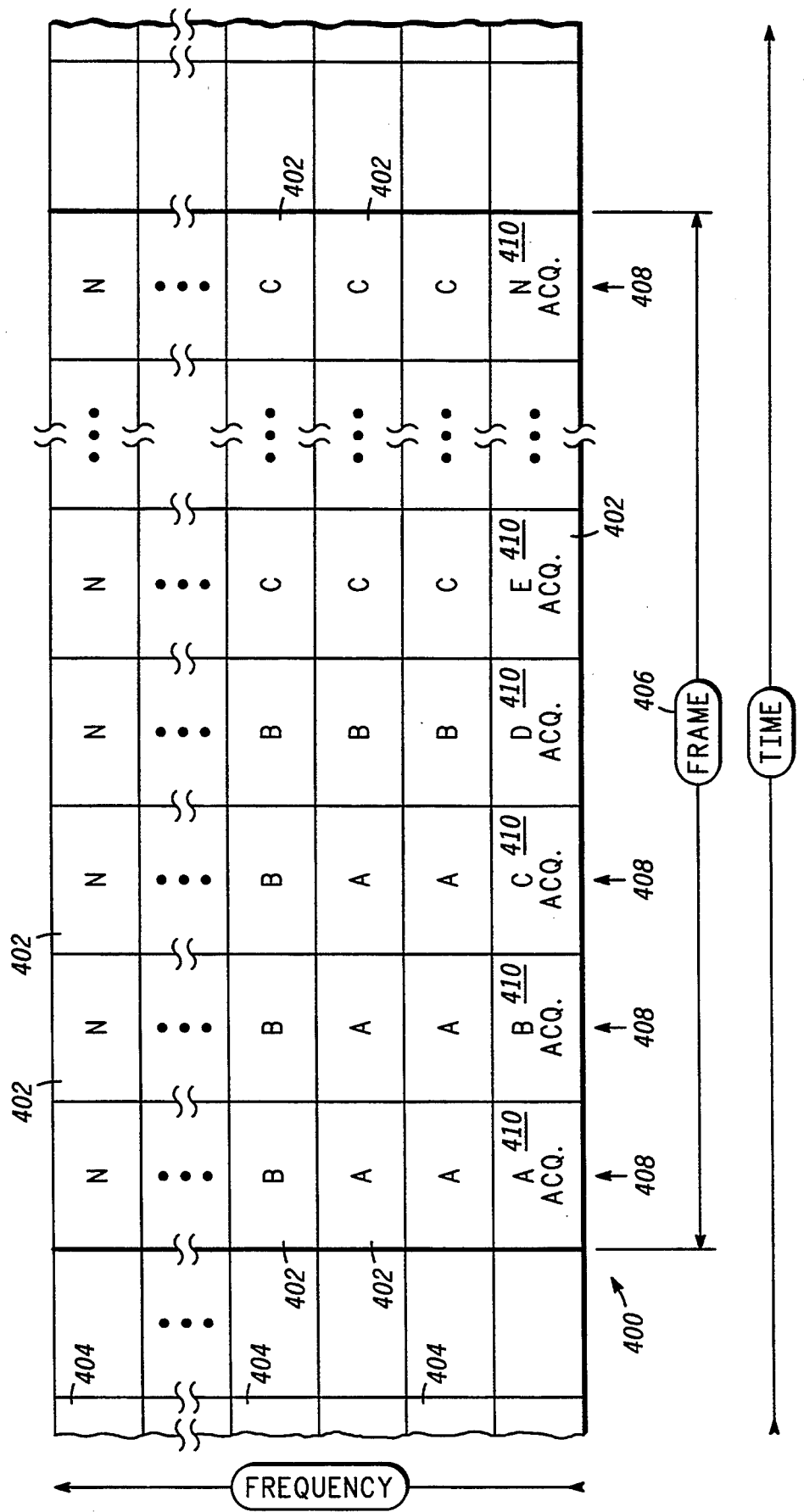
FIG. 4 shows a block diagram of a given spectrum that is divided into channels.

FIG. 4 shows an exemplary block diagram of a spectrum 400 which primary, secondary, or tertiary systems 100, 200, and 300, respectively, use in conducting communications with subscriber units 500. As illustrated in FIG. 4, spectrum 400 may be divided into numerous orthogonal channels 402. The precise manner of dividing spectrum 400 into channels 402 is unimportant to the present invention. For example, spectrum 400 may be divided into discrete frequency bands, discrete time slots, discrete coding techniques, or a combination of these. FIG. 4 illustrates a combination of time division and frequency division multiplexing. In other words, spectrum 400 is divided into discrete frequency bands 404 and discrete time frames 406. Each frame 406 is subdivided into time slots 408. Time slots 408 repeat from one frame 406 to another frame 406. Although not shown, time slots 408 may be divided into separate transmit and receive time slots, and such separate time slots need not be located adjacent to each other within frame 406. A given frequency band 404 in a given time slot 408 defines a single one of channels 402. Spectrum 400 may be divided into a thousand or more orthogonal channels.

Channels 402 are assigned to the above-discussed channel sets (A, B, etc.) used by primary system 100. Generally speaking, no particular algorithm need be followed in assigning channels 402 to channel sets. However, it is desirable that an acquisition channel 410 having predetermined parameters be assigned to each channel set. An acquisition channel 410 is broadcast by a communication system to allow subscriber units 500 and controllers from subordinate communication systems to achieve synchronization. Once synchronization has been achieved, communications may commence with the system broadcasting the acquisition channel 410. Preferably, primary system 100 continually broadcasts one acquisition channel 410 in each cell 106. Secondary and tertiary systems 200 and 300 preferably broadcast one acquisition channel 410 for their respective regions of coverage. Nothing requires the acquisition channels 410 to have precisely the same characteristics as other channels, and relaxed timing parameters may be desirable to ease synchronization.

An acquisition channel 410 desirably conveys information to any party who may receive it. For example, an acquisition channel 410 may carry data or an absence of data to aid synchronization. Channel 410 may identify the source of the broadcast as a primary system node (i.e. a satellite 102), a secondary system, or a tertiary system. For channels 410 broadcast by primary system 100, additional data may identify a cell ID and satellite ID along with the channel-to-cell allocations used by the cell 106 associated with the channel 410. Such channel-to-cell allocations may be briefly communicated by identifying a channel set (A, B, etc.). In addition, channel 410 may identify another channel to use in transmitting initial registration or other messages back to the system originating the channel 410.

Figure 5:
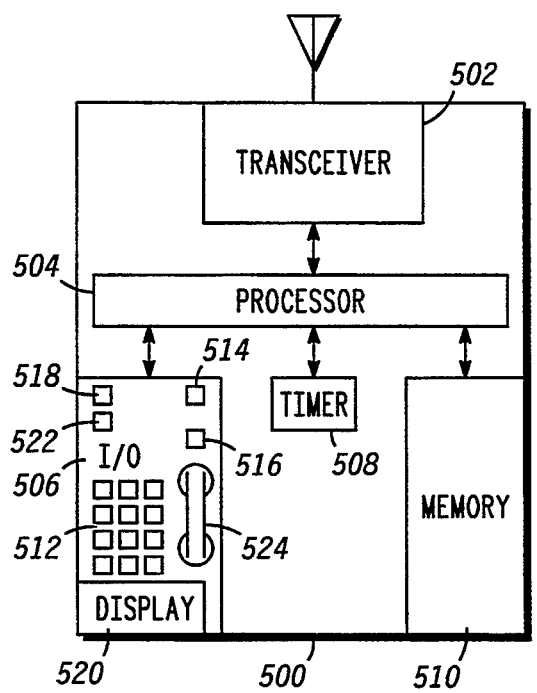
FIG. 5 shows a block diagram of a subscriber unit which may communicate with primary, secondary, or tertiary communication systems.

FIG. 5 shows a block diagram of a subscriber unit 500 which communicates with any of primary, secondary, or tertiary systems 100, 200, or 300, respectively, and through such systems to another subscriber unit 500 or another telecommunication device. Subscriber unit 500 includes a transceiver 502 which transmits and receives signals in a format compatible with spectrum 400 as used by systems 100, 200, and 300. Transceiver 502 couples to a processor 504, which controls the frequency and timing parameters upon which transceiver 502 operates. In addition, processor 504 preferably controls the power level at which transceiver 502 transmits signals. Processor 504 additionally couples to an input-/output (I/O) section 506, a timer 508, and a memory 510. Processor 504 uses timer 508 to maintain the current date and time. Memory 510 includes data which serve as instructions to processor 504 and which, when executed by processor 504, cause subscriber unit 500 to carry out procedures which are discussed below. In addition, memory 510 includes variables, tables, and databases that are manipulated due to the operation of subscriber unit 500.

I/O section 506 of subscriber unit 500 is used to collect inputs from a user of subscriber unit 500 and to provide outputs for the user to perceive. Section 506 includes, for example, a keypad 512, which is used to collect numbers that identify a party to whom a call may be directed. A power switch 514 is used to control the energization and de-energization of subscriber unit 500. A send key 516 is used to indicate when a called party's number has been entered, and a hook switch 518 is used in a conventional sense. A display 520 is used to present visual information to the user, and an alarm or beeper 522 is used to provide an audible alert to the user. A handset or multitone 524 transforms audible signals into electrical signals, and vice-versa.

Figure 6:
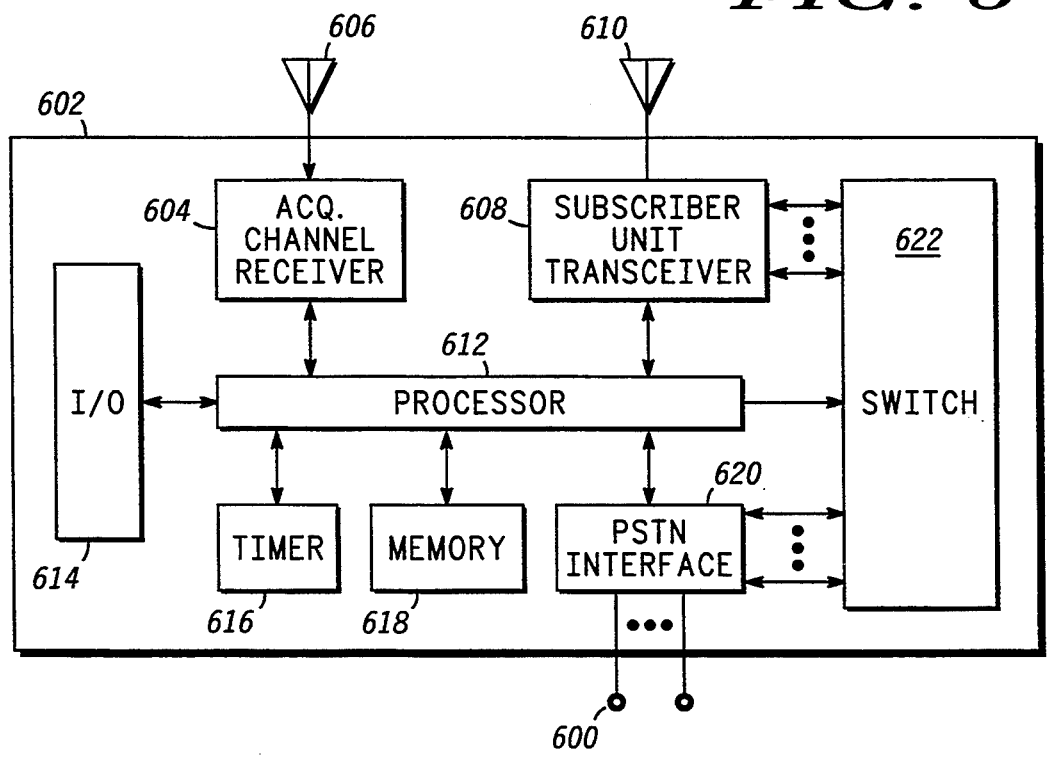
FIG. 6 shows a block diagram that represents both a secondary communication system controller and a tertiary communication system controller.

FIG. 6 shows a block diagram of a secondary system controller 600. Secondary controller 600 includes an acquisition channel receiver 604, which couples to an antenna 606. In addition, controller 600 includes a multichannel subscriber unit transceiver 608 which couples to an antenna 610. Each of receiver 604 and transceiver 608 are compatible with channels 402. The position of antenna 606 defines monitoring location 204. The position of antenna 610 and the power with which signals are transmitted from antenna 610 defines a region 202. Those skilled in the art will appreciate that the functions performed by receiver 604 and antenna 606 may, in some applications, be included in transceiver 608 and antenna 610. Preferably, antenna 606 and antenna 610 are located at approximately the same location. Transceiver 608 is configured to simultaneously accommodate any number of calls using any number of channels 402 from spectrum 400.

Receiver 604 and transceiver 608 couple to a processor 612. Processor 612 controls the channels to which receiver 604 and transceiver 608 are tuned. Processor 612 also couples to an I/O section 614, a timer 616, a memory 618, and a PSTN interface 620. A cross-connect switch 622 has ports which couple to transceiver 608 and ports which couple to PSTN interface 620. Processor 612 couples to an input of switch 622 to control the connection of various ports of switch 622. Nothing requires ports of transceiver 608 to be switched to only ports of PSTN interface 620. Thus, a call routed through one port of transceiver 608 may be switched to another port of transceiver 608, allowing two or more subscriber units 500 within secondary region 202 to communicate directly with each other.

I/O section 614 receives input from keyboards and other input devices and provides data to display terminals, printers, and other output devices. Processor 612 uses timer 616 to maintain the current date and time.

Memory 618 includes semiconductor, magnetic, and other storage devices for storing data that serve as instructions to processor 612 and which, when executed by processor 612, cause controller 600 to carry out procedures which are discussed below. In addition, memory 618 includes variables, tables, and databases that are manipulated due to the operation of controller 600. Through interface 620, controller 600 communicates with the PSTN 210. Likewise, controller 600 establishes calls through interface 620 and switch 622, between subscriber units 500 and other telecommunication devices. Accordingly, controller 600 operates as a base station through which subscriber units 500 communicate during a call.

In the preferred embodiment, the block diagram of FIG. 6 also applies to tertiary controller 602. In other words, tertiary controller 602 has a block diagram which is similar to that shown in FIG. 6. However, antenna 606 and receiver 604 are optional features of tertiary controller 602. As will be discussed below, tertiary controller 602 need not receive changing acquisition channel information broadcast by primary system 100. Rather, a secondary controller 600 within whose jurisdiction a tertiary controller 602 resides determines channels that are usable at the tertiary controller 602. Data identifying such channels may be sent to the tertiary controller 602 in any convenient manner, such as through PSTN 210 or through subscriber unit transceiver 608. Those skilled in the art will appreciate that other differences between secondary controllers 600 and tertiary controllers 602, if any, may be established through programming instructions stored in memory 618.

Figure 14:
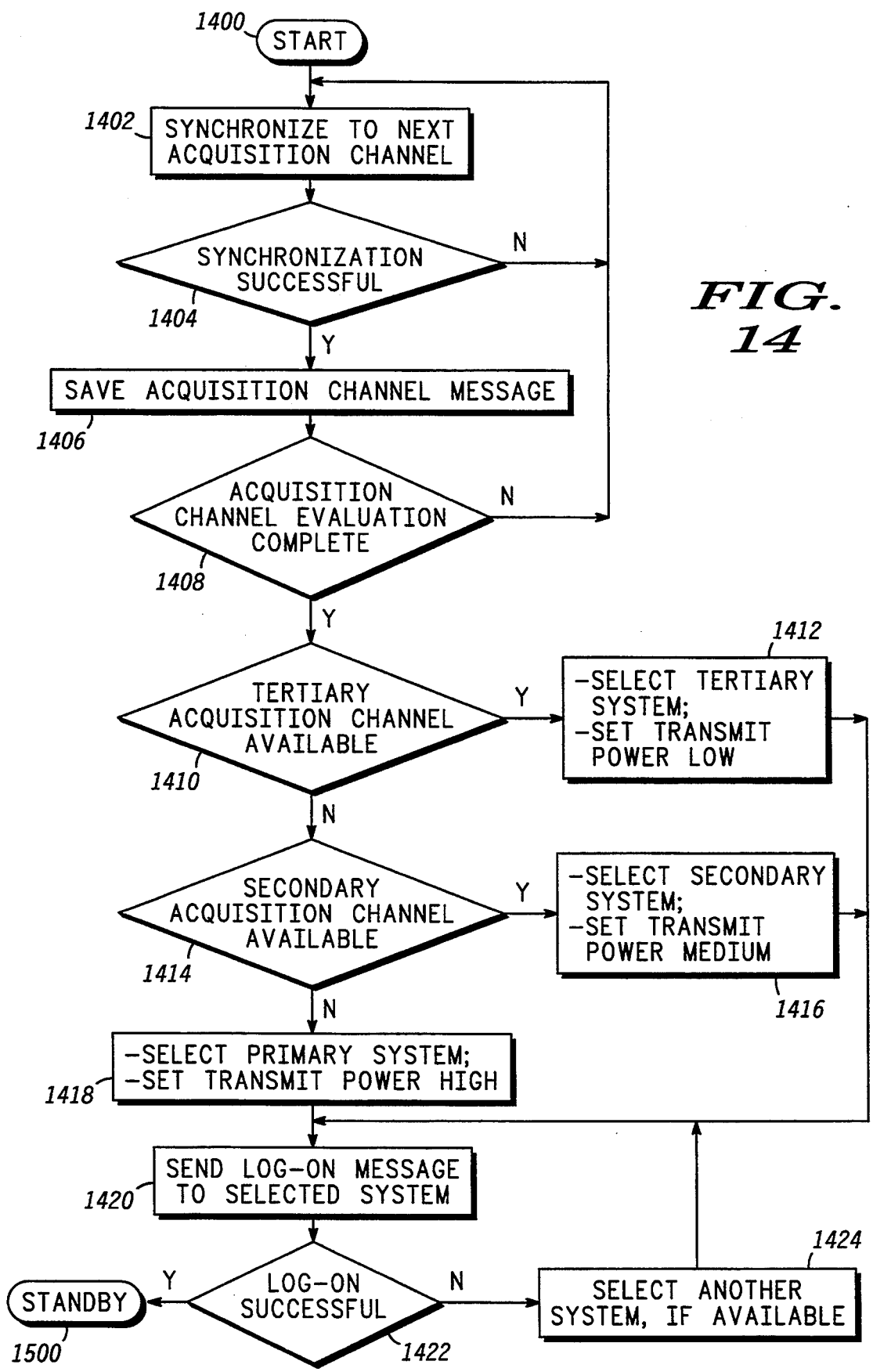
FIG. 14 shows a flow chart of a Start procedure performed by a subscriber unit.
Figure 15:
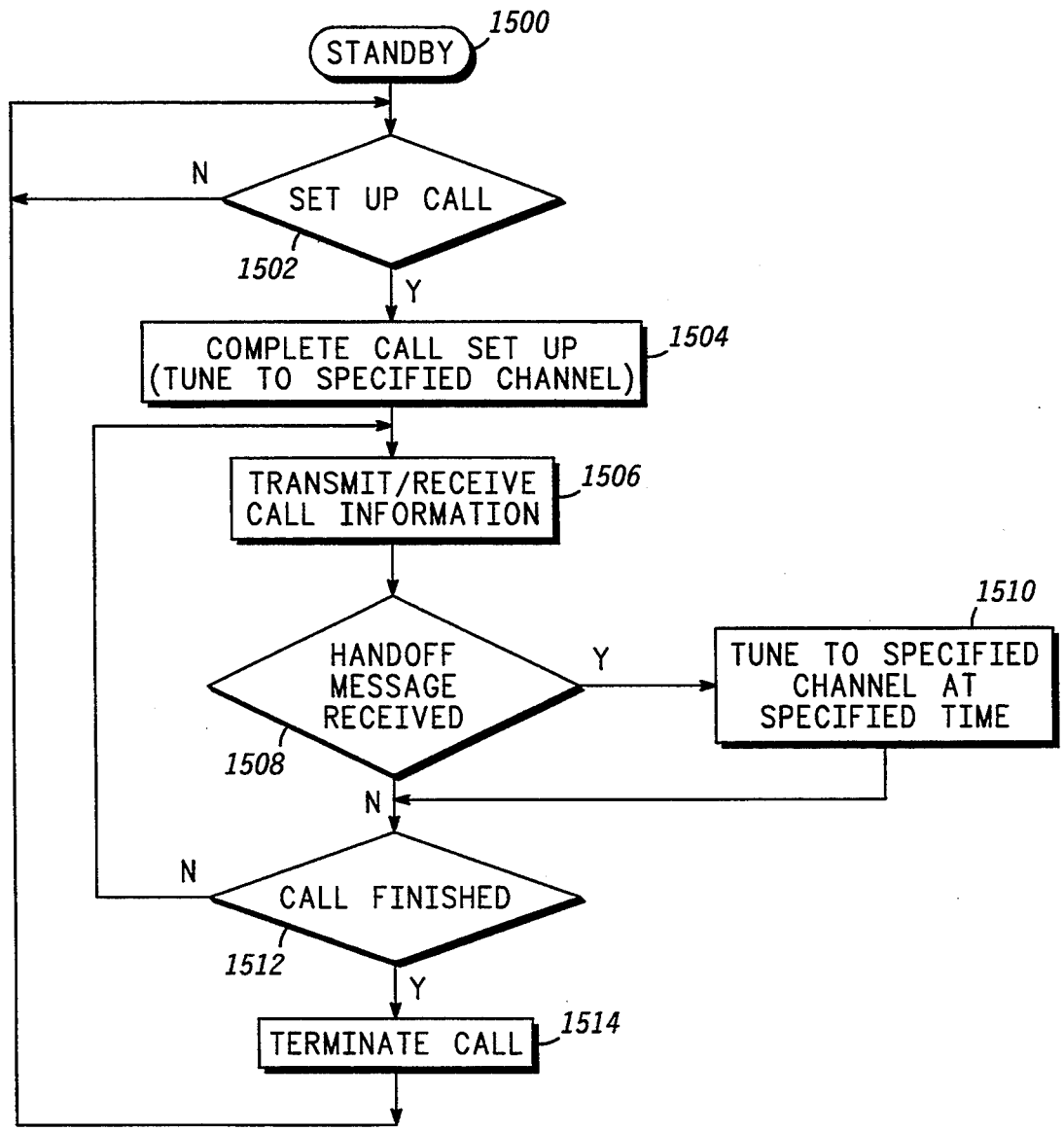
FIG. 15 shows a flow chart of a Standby procedure performed by a subscriber unit.

FIGS. 7–13 describe procedures performed at a secondary system controller 600 so that its secondary communication system 200 will be compatible with primary communication system 100. In the preferred embodiments, all secondary controllers 600 perform substantially the same procedures. Thus, the procedures outlined by FIGS. 7–13 apply to multiple secondary controllers. In addition, the procedures performed by tertiary controllers 602 are similar to, if not less extensive than, the procedures of FIGS. 7–13. Thus, the operation of tertiary controllers will include many of the tasks and features discussed in connection with FIGS. 7–13. FIGS. 14–15 describe procedures performed by a subscriber unit 500 in communicating with one of primary, secondary, or tertiary systems 100, 200, or 300. In the preferred embodiments, all subscriber units 500 perform substantially the same procedures for the purposes of the present invention.

Figure 7:
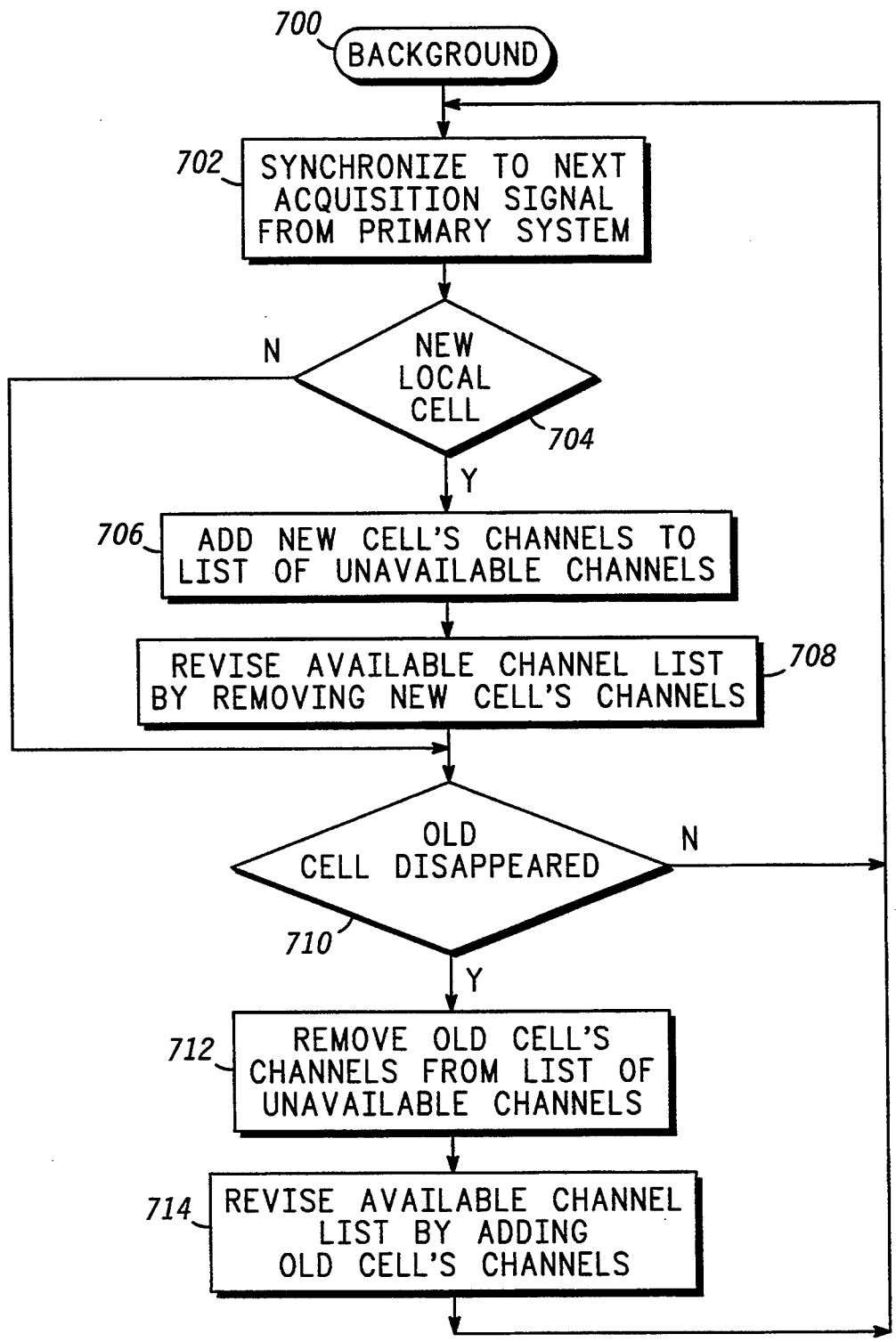
FIG. 7 shows a flow chart of a Background procedure performed by a secondary communication system controller.

FIG. 7 shows a flow chart of a Background procedure 700 performed by secondary controller 600. Generally speaking, procedure 700 continuously runs in a background mode regardless of other procedures which may be simultaneously activated. Procedure 700 performs a task 702 to synchronize to a next available acquisition channel 410 broadcast from primary system 100. Not all acquisition channels 410 broadcast from primary system 100 are receivable by controller 600. The most likely acquisition channel 410 for receipt by controller 600 will be broadcast in the local cell. However, at various times, a controller 600 may be able to receive acquisition channels 410 from cells 106 adjacent to the local cell and from adjacent secondary systems 200 or very close tertiary systems 300. As discussed above, data broadcast in acquisition channels 410 identify the source of the broadcast as a primary, secondary, or tertiary system. Such data may be used by task 702 to filter out acquisition channels 410 from secondary or tertiary systems 200 or 300, respectively. Controller 600 may analyze signal strength and/or Doppler of an acquisition channel 410 to distinguish a local cell's acquisition channel 410 from other acquisition channels 410 intended for other cells 106.

After task 702 has acquired a primary system's acquisition channel 410, a query task 704 determines whether the acquisition channel signals a new local cell. As cells 106 move relative to monitoring location 204, parameters of their acquisition channels, such as amplitude and Doppler, change. By comparing such parameters with similar parameters for other primary system acquisition channels, controller 602 may conclude that it is now covered by a new local cell. When this happens, the identity of the local cell, as broadcast by the cell's acquisition channel, changes.

When task 704 determines that monitoring location 204 is covered by a new local cell, a task 706 adds the channels allocated to the new local cell to a list 800 of unavailable channels. Controller 600 may learn of the new local cell's channels through allocation data broadcast over the new local cell's acquisition channel. This allocation data may individually identify the channels being used or they may identify a channel set. Task 706 can translate channel set data into a list of channels.

Figure 8:
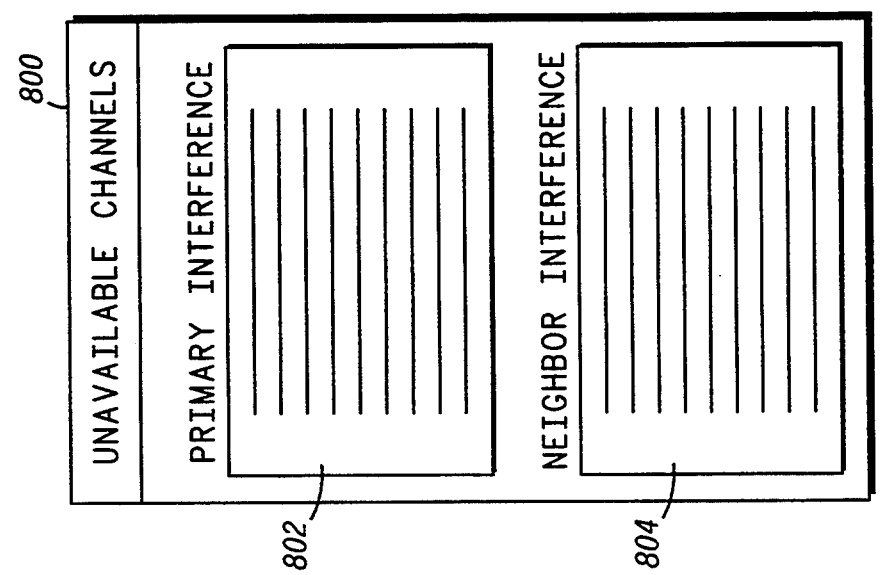
FIG. 8 shows a block diagram of a memory structure used by a secondary communication system controller and organized to store a list of unavailable channels.

FIG. 8 shows a block diagram of unavailable channels list 800. Controller 600 maintains list 800 within memory 618. In particular, list 800 includes a structure 802 which identifies channels likely to cause interference with primary system communications and a structure 804 which identifies channels likely to cause interference with secondary system communications being conducted in adjacent secondary regions 202. Task 706 places channel identifying data in structure 802. Since the channels listed in structure 802 are currently being used in the new local cell, their use in the present secondary system 202 would have a higher likelihood of interfering with primary system communications than other channels within spectrum 400.

Figure 9:
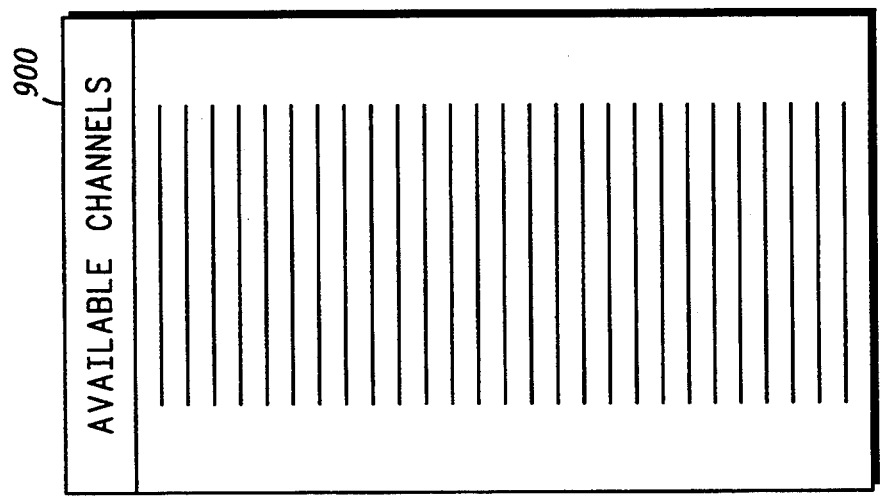
FIG. 9 shows a block diagram of a memory structure used by a secondary communication system controller and organized to store a list of available channels.

With reference back to FIG. 7, after task 706, a task 708 revises an available channels list 900. FIG. 9 shows a block diagram of available channels list 900. In general, channels listed in list 900 may be used in secondary region 202 by controller 600 without risking interference with primary or secondary communications. Task 708 revises list 900 by removing any of the channels identified therein that were just added to unavailable channel structure 802 as a result of entering a new local cell. Such channels will not be used in upcoming secondary communications.

Referring back to FIG. 7, those skilled in the art will appreciate that task 708 may be performed either explicitly or implicitly. In other words, the absence of channels in available channels list 900 may be inferred from their inclusion in unavailable channel structure 802, without actually forming list 900 in memory 618.

After task 708 and/or when task 704 determines that an acquired primary system acquisition channel does not signal a new local cell, procedure 700 performs a query task 710. Task 710 determines whether the acquired acquisition channel suggests that an old local cell is disappearing. In other words, task 710 determines whether monitoring location 202 is leaving a local cell. If monitoring location 202 is not leaving a local cell, program control loops back to task 702, discussed above. Procedure 700 will repeat the process with the next primary acquisition channel that it can acquire. By repeatedly examining primary system acquisition channels, procedure 700 causes secondary controller 600 to track movement of satellites 102 along with changes in local cell identities and channel sets used therein.

The determination of task 710 may be performed by examining signal strength and/or Doppler parameters of the acquired acquisition signal and comparing such parameters to predetermined thresholds and/or historical values. Those skilled in the art will appreciate that nothing requires procedure 700 to conclude that a new local cell is entered at precisely the same time that an old local cell is left. Preferably, procedure 700 causes the new local cell entry determination to occur prior to the old local cell exit determination so that channels from both the old and new local cells are listed as being unavailable for a brief period when monitoring location 204 is near a boundary between cells 106 (see FIG. 2).

When task 710 determines that an old local cell is being left, a task 712 removes the channels contained in the old cell's channel set from unavailable channel structure 802. Next, a task 714 revises available channel list 900 by adding the channels contained in the old cell's channel set to list 900. However, before adding a channel to available channel list 900, task 714 may desirably evaluate unavailable structure 804 to determine if any of these channels have been listed as unavailable due to their use in an adjacent secondary region 202. Channels listed in unavailable structure 804 are preferably omitted in available list 900. After task 714, program control loops back to task 702, discussed above, to continue tracking the movement of satellites 102 and cells 106.

As a result of performing procedure 700, lists are made of those channels that are available for use by secondary system 200 and of those channels that are unavailable for use by secondary system 200. Moreover, these lists are kept current to track the movement of satellites 102 and cells 106.

Figure 10:
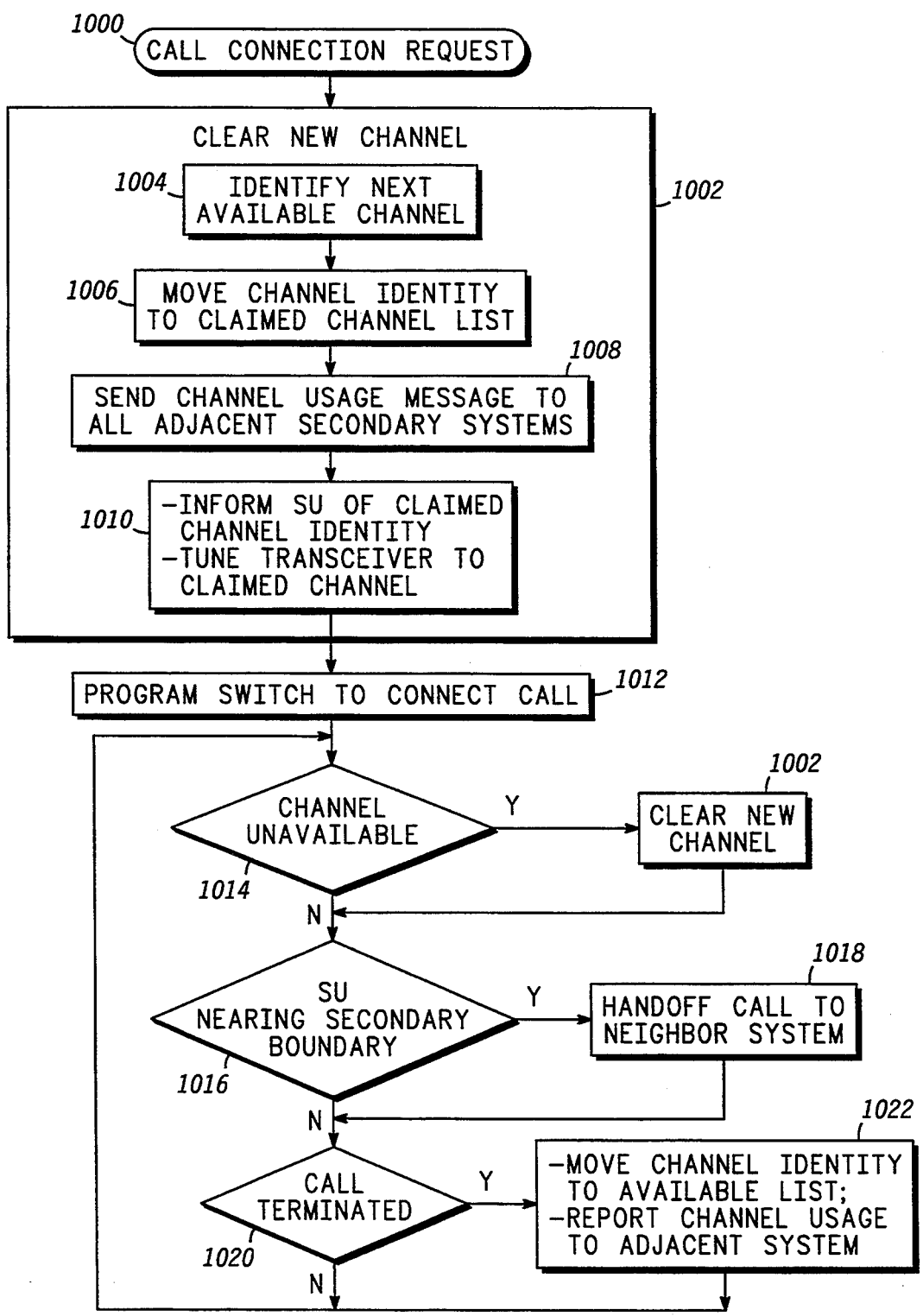
FIG. 10 shows a flow chart of a Call Connection Request procedure performed by a secondary communication system controller.

FIG. 10 shows a flow chart of a Call Connection Request procedure 1000 performed by a secondary controller 600. Procedure 1000 is performed whenever controller 600 receives a request to connect a call. As discussed above, procedure 1000 may be performed independently by other controllers 600 in separate secondary regions 202. A request to connect a call may originate from PSTN 210 when a telecommunication device requests placement of a call to a subscriber unit 500 located within secondary region 202. Alternatively, a request to connect a call may originate from a subscriber unit 500 within secondary region 202 that wishes to call another subscriber unit 500 or a telecommunication device coupled to PSTN 210. Prior to performing procedure 1000, a ringing procedure, well known to those skilled in the art, has been performed to determine that the called party is available to accept the call. Thus, procedure 1000 establishes and maintains the channels and connections needed to allow the call to take place.

Procedure 1000 performs a process 1002 to clear a new channel for use in conducting communications with the subscriber unit 500 involved in the call. If more than one subscriber unit 500 located within secondary region 202 is involved in the call, then process 1002 is performed for each of the units 500. Process 1002 includes a task 1004 which identifies the next available channel. The next available channel may be determined from available channel list 900; alternatively, it may be determined by evaluating unavailable channel list 800.

Figure 11:
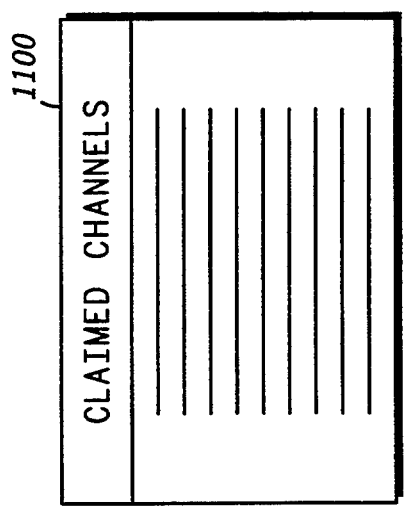
FIG. 11 shows a block diagram of a memory structure used by a secondary communication system controller and organized to store a list of claimed channels.

After task 1004, a task 1006 moves the channel identity to a claimed channel list 1100. FIG. 11 shows a block diagram of claimed channel list 1100 maintained in memory 618. In moving the channel identity, the selected channel's identity is removed from available channel list 900.

Next, a task 1008 sends a channel usage message to all adjacent secondary systems. When the channel is first being claimed, the channel usage message merely identifies the claimed channel to the adjacent secondary systems so that the adjacent secondary systems will refrain from using the claimed channel. The channel usage messages may be sent via any convenient link, such as PSTN 210 or primary communication system 100. Clear new channel process 1002 may also be performed while a call is in progress, as will be discussed below. In this situation, channel usage messages will identify both an old channel being released along with a new channel being claimed.

With reference to FIG. 2, a maximum of six messages may be sent to adjacent secondary systems when a secondary region 202 is completely surrounded by neighbor regions 202. Messages need not be sent to secondary systems 200 that are not adjacent to the present secondary system.

After task 1008, a task 1010 informs the subscriber unit 500 for which the channel is being claimed of the channel's identity and programs transceiver 608 to tune one of its free channels to the indicated channel. The subscriber unit 500 may be informed of the claimed channel's identity via a transmission over the secondary system's acquisition channel or any other channel that the subscriber unit 500 will be monitoring at this stage in the call setup process. After the performance of task 1010, a new channel has been claimed for the subscriber unit 500 being serviced, and program control exits from process 1002.

After task 1010 of process 1002, a task 1012 programs switch 622 to connect the call to the appropriate ports of transceiver 608 and/or PSTN interface 620. At this point, the call has been connected and will continue indefinitely until terminated by either party. While the call is continuing, a query task 1014 determines whether the channel being used by the call has become unavailable. This determination may be made by monitoring unavailable channels list 800. The channel being used by the call may become unavailable, for example, when a new local cell which uses the channel for primary communications moves over the secondary region 202 in which the call is taking place. In this situation, Background procedure 700 will identify the channel as being unavailable in structure 802, as discussed above.

When a channel being used in an ongoing call becomes unavailable, procedure 1000 again performs clear new channel process 1002. As discussed above, process 1002 selects an available channel, informs neighbor secondary systems 200 of the new claimed channel, informs subscriber unit 500 of the new channel's identity, and causes communications to take place over the newly established communication link. This handoff is transparent to all parties engaged in the call. After the handoff of process 1002, program control proceeds to a query task 1016. In addition, program control proceeds to task 1016 when task 1014 determines that a call's channel has not gone unavailable.

Task 1016 determines whether a subscriber unit 500 involved in the call is nearing a boundary with an adjacent secondary system. In the preferred embodiment, it is subscriber unit 500 that actually performs this determination by evaluating relative signal strengths of acquisition channels broadcast from the respective secondary systems. If the subscriber unit 500 wishes a handoff, it may request the handoff from its current secondary system 200. Task 1016 detects such a request. When a currently serviced subscriber unit 500 nears a secondary system boundary, a task 1018 hands the call off to the adjacent secondary system 200. Task 1018 may advantageously send a data communication to the adjacent system to inform the adjacent system of the handoff and to receive a channel assignment and timing information from the adjacent system. The new channel assignment and timing information may then be sent to the subscriber unit 500 and the call forwarded to the adjacent system. After the call has been forwarded, any released channels may be listed in available channel list 900.

After task 1018 and/or when task 1016 determines that a subscriber unit 500 is not nearing a boundary, a query task 1020 determines whether the call has been terminated. When the call has been terminated, a task 1022 moves the identity of the channel being used by the call to available channel list 900 and reports the change in channel usage to the adjacent secondary systems 200. After task 1022 and/or when task 1020 determines that the call has not been terminated, program control loops back to task 1014 to continue to monitor the ongoing call. Accordingly, secondary communication system 200 communicates with a subscriber unit 500 using channels from the set of available channels. Secondary communication system 200 tracks changes in channel availability, forcing handoffs whenever claimed channels become unavailable.

Figure 12:
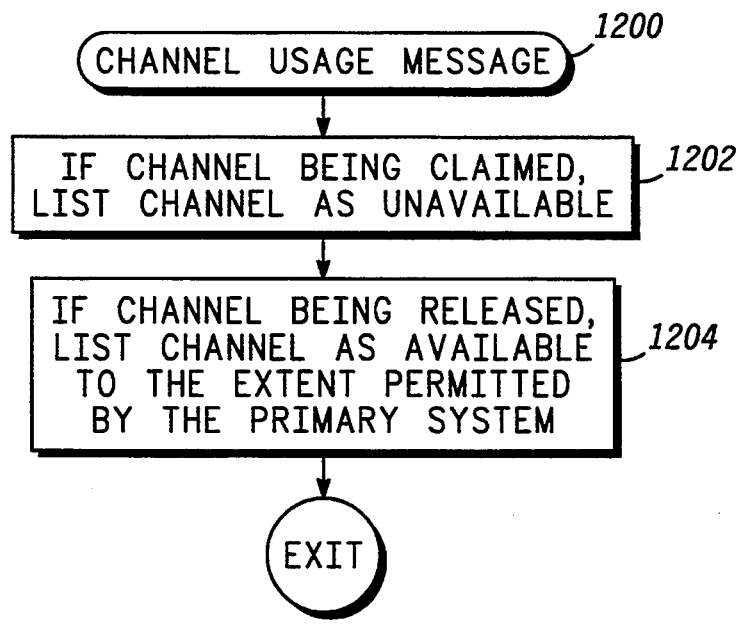
FIG. 12 shows a flow chart of a Channel Usage Message procedure performed by a secondary communication system controller.

FIG. 12 shows a procedure 1200 performed by a secondary controller 600 when it receives one of the above-discussed channel usage messages. Channel usage messages are received when either a new channel is being claimed for use in an adjacent secondary region 202 or when a previously used channel in an adjacent secondary region 202 is being released.

Procedure 1200 performs a task 1202 to list any newly claimed channels in unavailable structure 804. As discussed above, unavailable structure 804 forms a part of unavailable list 800. Preferably, structure 804 is subdivided to include a section for each adjacent secondary system. When secondary controller 600 performs the above-discussed Call Connection Request procedure 1000, the channel claimed by the neighbor secondary system 200 will be avoided and not selected for use. By avoiding the use of channels currently claimed and used in adjacent secondary systems 200, interference between communications taking place in adjacent secondary systems 200 is avoided.

Procedure 1200 also performs a task 1204 to remove any newly released channels from structure 804 of unavailable list 800 and to list the identified channels in available channel list 900. However, before listing a released channel as being available, task 1204 first evaluates unavailable list 800 to determine if the channel is still listed therein as being unavailable. The channel may still be listed as being unavailable if, for example, another adjacent secondary system has already claimed it or if a local cell using the channel has moved over the secondary system's region 202. After tasks 1202 and 1204, program control exits from procedure 1200.

Figure 13:
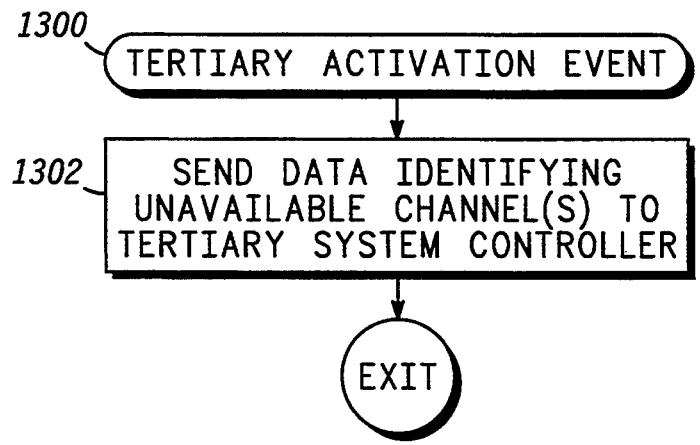
FIG. 13 shows a flow chart of a Tertiary Activation Event procedure performed by a secondary communication system controller.

FIG. 13 shows a procedure 1300 performed by a secondary controller 600 when it detects a tertiary activation event. Any number of events may be interpreted as a tertiary activation event. For example, such events may occur at regular intervals so that time serves as the activation event. Alternatively, such events may occur when a tertiary system controller 602 requests that they occur. Still further, such events may occur in response to other conditions, such as changes in channel unavailability and availability lists 800 and 900.

When such an event occurs, procedure 1300 performs a task 1302. Task 1302 sends data identifying unavailable channel(s) to tertiary system controllers 602 within the jurisdiction of the present secondary system controller 600. As a minimum, task 1302 sends one or more channel identities from unavailable structure 802. As discussed above, this data may be communicated in any convenient manner. For example, the data may be communicated via PSTN 210. Alternatively, tertiary system controller 602 may be logged into secondary system 200 as a subscriber unit 500, and such data may be communicated via secondary system 200. In yet another embodiment, both secondary system 200 and tertiary system 300 may be logged into primary system 100 as subscriber unit's 500, and such data may be communicated via primary system 100.

Due to task 1302, tertiary systems 300 know current channel to local cell allocations for primary system 100. Moreover, tertiary systems 300 know the identities of those channels that will not be used by the secondary system 200 within whose jurisdiction the tertiary systems 300 reside. Tertiary controllers 602 list such channel identities in their own available channel list. Any channels not listed as being available to the tertiary system may be considered to be unavailable to the tertiary system. Tertiary system controllers 602 may then perform a procedure similar to procedure 1000 to select channels from their available channels list for use within their tertiary systems 300. Moreover, such procedures may continuously monitor their availability lists to note when channels become unavailable and to handoff calls to other channels that may then be available.

FIGS. 14–15 show flow charts that depict the operation of a subscriber unit 500 in accordance with the present invention. FIG. 14 shows a Start procedure 1400 and FIG. 15 shows a Standby procedure 1500.

With reference to FIG. 14, a subscriber unit 500 performs procedure 1400 whenever it is powered up or has lost an acquisition signal. In addition, procedure 1400 may be performed in a background mode after an acquisition signal has been captured to determine when better acquisition signals become available.

Procedure 1400 performs a task 1402 to synchronize with a next acquisition channel. The acquisition channel may have been broadcast from either primary system 100, a secondary system 200, or a tertiary system 300. Successful synchronization is achieved when subscriber unit 500 can read the data communicated by or through the acquisition channel. When the synchronization process is unsuccessful, a query task 1404 routes program control back to task 1402 to select another acquisition channel. When synchronization is successful, the success indicates that subscriber unit 500 has located a system with which the subscriber unit 500 may be able to communicate.

Upon successful synchronization, a task 1406 saves the data carried by the acquisition channel. As discussed above, such data identifies the originator of the channel as a primary, secondary, or tertiary system and identifies other channels which may be used for sending a message to the system. After task 1406, a query task 1408 determines whether acquisition channel evaluation is complete. In other words, task 1408 determines whether subscriber unit 500 has looked for all possible acquisition channels. If the acquisition channel evaluation is not complete, program control loops back to task 1402, discussed above.

When acquisition channel evaluation is complete, a query task 1410 determines whether one of the successfully captured acquisition channels was broadcast from a tertiary system. If so, a task 1412 selects this system as the system with which to communicate, and adjusts the power level of its transceiver 502 accordingly. In particular, the power level is set to a low setting to minimize any risk of interference with primary communications at a receiver of a satellite 102.

If task 1410 determines that no tertiary system acquisition signal has been captured, then a query task 1414 determines whether one of the successfully captured acquisition channels was broadcast from a secondary system. If so, a task 1416 selects this secondary system as the system with which to communicate, and adjusts the power level of its transceiver 502 accordingly. In particular, the power level is set to a medium setting to minimize any risk of interference with primary communications at a receiver of a satellite 102 but to permit successful communications throughout the secondary region 202.

If task 1414 determines that no secondary system acquisition channel has been captured, then a task 1418 selects primary system 100 as the system with which to communicate, and adjusts the power level of its transceiver 502 accordingly. In particular, the power level is set to a high setting so that transmissions can be successfully received at satellites 102.

As a result of tasks 1410–1418, subscriber unit 500 refrains from selecting primary system 100 unless secondary systems 200 and tertiary systems 300 are unavailable. Likewise, subscriber unit 500 refrains from selecting a secondary system 200 unless tertiary systems 300 are unavailable. Hence, subscriber unit 500 selects the available system having the smallest area of coverage to service its communication needs. The selection of the smallest cell system for providing communication services allows the greatest amount of communication traffic to be handled in the geographic area where subscriber unit 500 is located. Channels used by larger cell systems are left free for use by subscriber units 500 which have no smaller cell systems available.

After tasks 1412, 1416, or 1418, a task 1420 sends a log-on message to the selected system. The log-on message identifies the subscriber unit 500 to the selected system and serves to register the subscriber unit 500 with the selected system. The message may be sent via a transmission over a channel specified by the selected system's acquisition channel and recorded above in task 1406. After task 1420, a query task 1422 determines whether the log-on attempt of task 1420 was successful. Task 1422 may make this determination by waiting for and evaluating an acknowledgement message from the selected system. The acknowledgement message may be received over the receive portion of the same channel used for transmitting the log-on message, or over any other channel known to both subscriber unit 500 and the selected system. If the log-on attempt was successful, program control proceeds to Standby procedure 1500, discussed below in connection with FIG. 15.

Subscriber unit 500 is now ready to originate or terminate calls.

If task 1422 determines that the log-on attempt was not successful, then a task 1424 selects another system and adjusts its transmission power level accordingly. A log-on attempt may be unsuccessful for a number of reasons. For example, the selected system may have failed to successfully receive the log-on message. Alternatively, the selected system may have been programmed to refrain from registering the particular subscriber unit 500 due to a failure of the owner to pay bills for past communication services or for geopolitical reasons. The next system selected is prioritized to favor tertiary, secondary, then primary systems, as discussed above. After selecting another system, program control loops back to task 1420, discussed above, to attempt to log-on to the newly selected system. If no other system is available for selection at task 1424, then subscriber unit 500 may go inactive for a predetermined period of time (not shown) or loop back to task 1402 (not shown).

FIG. 15 shows a flow chart of Standby procedure 1500. Standby procedure 1500 is performed whenever subscriber unit 500 has logged onto a communication system, such as primary system 100, a secondary system 200, or a tertiary system 300. At this point no call activity is taking place. It is procedure 1500 that determines when call activity occurs and that manages calls. Although not specifically shown, in a background mode subscriber unit 500 may continue to perform a procedure similar to Start procedure 1400 while Standby procedure 1500 is activated. In this background mode, subscriber unit 500 continues to monitor acquisition signals to detect when any movement of subscriber unit 500 may require switching the registration of subscriber unit 500 to another system. Such registration switching may occur through direct communication with a new system, such as by sending a log-on message, or through a request for switching registration sent to a system with which subscriber unit 500 may be currently registered. The current system may then communicate with the new system to effect the registration change.

Procedure 1500 performs a query task 1502 to determine whether a request has been received to set up a call. The request to set up a call may be received through I/O section 506 of subscriber unit 500 when a user of subscriber unit 500 is originating a call. In addition, a call setup request may be detected by receiving an incoming call message over a channel being monitored by subscriber unit 500. This incoming call message indicates that another party is attempting to place a call to subscriber unit 500. When no call setup request is detected, program control loops back to task 1502 to wait for a call setup request.

When a call setup request occurs, a task 1504 completes the call setup process. For calls originated at subscriber unit 500, this requires the sending of a message to the system upon which subscriber unit 500 is registered identifying the party being called, routing a ringing feedback signal back to handset 524, and waiting for a message from the system that indicates that the call may commence and that informs subscriber unit 500 of the identity of a particular channel to use in conducting the call. Task 1504 then tunes its transceiver 502 to the specified channel.

After task 1504, a task 1506 handles the transmission and reception of call information. In other words, data are collected from handset 524 and transmitted over the specified channel to the system, where the system then routes the information to the other party. Likewise, data from the other party are received from the system over the specified channel and routed to handset 524 where the data it may be perceived by a user of subscriber unit 500. Of course, those skilled in the art will appreciate that subscriber unit 500 is not limited to communicating only voice data and that computer or other automated data may be communicated as well.

After task 1506, a query task 1508 determines whether a handoff request message has been received. As discussed above, subscriber unit 500 may continue to monitor acquisition signals while procedure 1500 is active. A handoff may be needed, for example, when subscriber unit 500 determines that another system's acquisition signal indicates, due to its signal strength, Doppler, and the like, that subscriber unit 500 is now in the other system's jurisdiction and is leaving the current system's jurisdiction. As discussed above, subscriber unit 500 may send a message requesting a handoff, and the system will respond with a handoff needed message. Alternatively, a handoff may be needed when subscriber unit 500 is operating with a secondary system 200 or a tertiary system 300 and the movement of cells 106 causes the set of channels available to the system to change, as discussed above. In this situation, the system will send a handoff needed message to subscriber unit 500 without being requested to do so.

When task 1508 detects the handoff needed message, a task 1510 tunes transceiver 502 of subscriber unit 500 to a channel indicated in the handoff needed message at a precise time indicated in the handoff needed message. Thus, a new communication link over a new channel is established for continuation of the call. The new link is possibly, but not necessarily, made with a new system. After task 1510 and/or when task 1508 determines that no handoff message has been received, a query task 1512 determines whether the call is finished. The call may be considered finished when hook switch 518, or the equivalent, is manipulated or when a call finished message is received from the system. If the call is not finished, program control loops back to task 1506, discussed above, to continue to monitor the ongoing call. When the call is finished, a task 1514 performs any house-keeping processes needed to terminate the call, and program control loops back to task 1502, discussed above, to await the next call.

In summary, the present invention provides an improved communication system. In particular, one or more small cell communication systems are provided for use in cooperation with a large cell communication system. The large cell communication system may have an area of coverage as large as the entire surface of the earth. Any number of independent small cell systems reside within the area of coverage of the large cell system. All small cell systems use the same spectrum as is allocated to the large cell system. A network of communication systems that together carry an extremely large amount of communication traffic and cover an extremely large area results. The network of communication systems forms a hierarchy wherein a single subscriber unit may communicate with any of the systems in the network and preferably communicates with the available system having the smallest area of coverage.

The present invention has been described above with reference to preferred embodiments. However, those skilled in the art will recognize that changes and modifications may be made in these preferred embodiments without departing from the scope of the present invention. For example, subscriber units need not be configured to operate with all three levels of systems described herein. Some applications may devise a need for subscriber units which are compatible with fewer than all of primary, secondary and tertiary systems. Moreover, those skilled in the art will appreciate that not all of the three levels of system hierarchy described herein are required by the present invention, and that either secondary systems or tertiary systems may be omitted. Furthermore, those skilled in the art will readily understand that a wide range in organization and structure of tasks and memory structures may be employed in constructing the present invention. These and other changes and modifications which are obvious to those skilled in the art are intended to be included within the scope of the present invention.

What is claimed is:

1. A subordinate communication system which cooperates with a primary communication system, wherein said primary communications system projects a plurality of cells over Earth, allocates orthogonal channels of a spectrum in adjacent ones of said cells, and reuses channels in geographically spaced apart cells, said subordinate communication system comprising:

an antenna for projecting a secondary region over Earth, said antenna being located so that said secondary region and a local one of said cells occupy a common area;

receiving means for receiving allocation data from said primary communication system, said allocation data identifying channels allocated by said primary communication system for use in said local cell; and selecting means, coupled to said receiving means and said antenna, for selecting channels of said spectrum that are available for use in said secondary region, said selecting means being responsive to said allocation data, wherein:

said primary communication system is configured so that identities of said local cell and of said channels allocated for use therein change; and said subordinate communication system additionally comprises means, coupled to said receiving means, for tracking identities of channels allocated by said primary communication system for use in said local cell as said local cell changes.

2. A subordinate communication system as claimed in claim 1 wherein said selecting means is configured so that said channels of said spectrum that are selected as being available for use in said secondary region are not used in said local cell by said primary communication system.

3. A subordinate communication system as claimed in claim 1 additionally comprising:

a second antenna for projecting a second-secondary region over Earth, said second-secondary region and said secondary region occupying different areas, and said second-secondary region and any one cell occupying a second common area;

second means for receiving second allocation data from said primary communication system, said second allocation data identifying channels allocated by said primary communication system for use in said any one cell; and second means, coupled to said second receiving means and said second antenna, for selecting channels of said spectrum that are available for use in said second-secondary region, said second selecting means being responsive to said second allocation data.

4. A subordinate communication system as claimed in claim 3 wherein said secondary region and said second-secondary region reside adjacent each other, and said subordinate communication system additionally comprises means for sending messages from said secondary region to said second-secondary region to identify claimed channels, said claimed channels being used for communications in said secondary region, so that said claimed channels may be avoided in said second-secondary region.

5. A subordinate communication system as claimed in claim 1 additionally comprising:

means, coupled to said receiving means, for identifying unavailable channels of said spectrum, said unavailable channels being those which, if used within said secondary region, would have a higher likelihood of interfering with primary communication system communications than channels other than said unavailable channels of said spectrum;

a tertiary system controller having a tertiary communication system antenna located within said secondary region; and means, coupled to said identifying means, for communicating unavailable channel identities to said tertiary system controller.

6. A subordinate communication system as claimed in claim 5 wherein said tertiary system controller is configured to conduct communications through said tertiary communication system antenna within a tertiary region, all points of which reside an intimate distance from said tertiary communication system antenna, using said unavailable channels.

7. A subordinate communication system as claimed in claim 6 wherein said cells are projected by a primary communication system antenna, and said subordinate communication system additionally comprises a barrier that impedes propagation of said unavailable channels, said barrier being positioned substantially between said tertiary communication system antenna and said primary communication system antenna.

8. A subordinate communication system as claimed in claim 6 wherein said barrier is positioned between substantially all points within said tertiary region and said primary communication system antenna.

9. A method of integrating one or more subordinate communication systems with a primary communication system, wherein said primary communication system communicates using a spectrum divided into orthogonal channels allocated to cells projected over Earth, said method comprising steps of:

receiving a signal from said primary communication system, said signal being received at a monitoring location;

determining, in response to said receiving step, an available channel set of said spectrum, said available channel set not including channels allocated by said primary communication system to a local cell within which said monitoring location resides; and communicating in a secondary region, all points of which reside proximate to said monitoring location, using channels from said available channel set, wherein:

said cells projected over Earth by said primary communication system move with respect to said monitoring location; and said method additionally comprises a step of repeating said determining step to change said available channel set in response to movement of said cells.

10. A method as claimed in claim 9 wherein said method additionally comprises steps of:
receiving a signal from said primary communication system at a second monitoring location, said second monitoring location being spaced apart from said monitoring location;
determining a second available channel set of said spectrum, said second available channel set not including channels allocated by said primary communication system to the cell within which said second monitoring location resides; and
communicating in a second-secondary region, all points of which reside proximate said second monitoring location, using channels from said second available channel set.

11. A method as claimed in claim 9 wherein said secondary region and said second-secondary region reside adjacent to each other, and said method additionally comprises steps of:
sending a message from said secondary region to said second-secondary region to identify a claimed channel, said claimed channel being used for communications in said secondary region; and
refraining, in response to said sending step, from including said claimed channel in said second available channel set.

12. A method as claimed in claim 11 wherein said communicating in a secondary region step comprises the step of establishing a call that uses a first communication link between a base station located in said secondary region and a subscriber unit also located in said secondary region, and said method additionally comprises steps of:
establishing a second communication link between said subscriber unit and a second base station located in said second-secondary region when said subscriber unit is located proximate a boundary between said secondary region and said second-secondary region; and
handing off said call from said first communication link to said second communication link when said subscriber unit nears said boundary.

13. A method as claimed in claim 9 wherein:
said communicating step comprises a step of establishing a communication link between a base station located in said secondary region and a subscriber unit also located in said secondary region, said communication link using a first channel from said available channel set; and
said method additionally comprises the step of handing off said communication link from said first channel to a second channel when said cell movement causes said first channel to become unavailable in said secondary region.

14. A method as claimed in claim 9 wherein:
said primary communication system uses channels from said available channel set in one or more non-local cells; and
said communicating step comprises a step of adjusting power levels for said communications in said secondary region to prevent interference with primary communication system communication in said one or more non-local cells.

15. A method as claimed in claim 9 additionally comprising steps of:

determining an unavailable channel set of said spectrum, said unavailable channel set comprising channels which, if used proximate to said monitoring location, would have a higher likelihood of interfering with primary communication system communications than channels from said available channel set; and
communicating said unavailable channel set to a tertiary system controller located within said secondary region.

16. A method as claimed in claim 15 wherein said tertiary system controller couples to an antenna and said method additionally comprises a step of communicating in a tertiary region, all points of which reside an intimate distance from said antenna, using channels from said unavailable channel set.

17. A method as claimed in claim 16 additionally comprising a step of confining said tertiary region to a space existing substantially within a barrier that impedes propagation of channels from said unavailable channel set.

18. A method as claimed in claim 16 additionally comprising a step of adjusting power levels for said communications in said tertiary region to prevent interference with said primary communication system communication in said local cell.

19. A method of operating a subscriber unit in accordance with a hierarchical network of communication systems wherein primary and secondary systems have common areas of coverage, and said primary system has a larger area of coverage than said secondary system, said method comprising steps of;
receiving first and second acquisition signals;
obtaining first and second identity data from said first and second acquisition signals; respectively, said first and second identity data indicating whether said respective acquisition signal was broadcast from said primary system or said secondary system: and
refraining from communicating with said primary system when said first and second identity data indicate that said first and second acquisition signals were broadcast from said primary and secondary systems respectively, wherein:
said network of communication systems additionally includes a tertiary system that has a common area of coverage with said secondary system and has a smaller area of coverage than said secondary system;
said receiving step additionally receives a third acquisition signal;
said obtaining step additionally obtains third identity data, and said third identity data indicates that said third acquisition signal was broadcast from said tertiary system; and
said method additionally comprises a step of communicating with said tertiary system.

20. A method as claimed in claim 19 additionally comprising steps of:
selecting a communication system with which to communicate; and
adjusting a power level at which said subscriber unit transmits in response to whether said primary or said secondary system is selected in said selecting step.

21. A method as claimed in claim 19, additionally comprising, prior to said obtaining step, a step of determining that communications may be conducted with either of said primary or secondary systems.

22. A method as claimed in claim 19, additionally comprising a step of communicating with said secondary system when said obtaining step obtains only said first and second identity data.

23. A method as claimed in claim 19, wherein said method additionally comprises steps of:
   selecting whether to communicate with said primary, secondary, or tertiary communication system; and
   adjusting a power level at which said subscriber unit transmits to a relatively low level when said tertiary communication system is selected in said selecting step, to a relatively medium level when said secondary communication system is selected in said selecting step, and to a relatively high level when said primary communication system is selected in said selecting step.

24. A subscriber unit for operating in accordance with a hierarchical network of communication systems wherein primary, secondary and tertiary systems have common areas of coverage, and said primary system having a larger area of coverage than said secondary system, said tertiary system having a smaller area of coverage than said secondary system, each of said communication systems being coupled to a public switched telecommunication network (PSTN), said subscriber unit comprising:
   a transceiver; and
   a processor coupled to said transceiver,
   wherein said transceiver includes means for receiving first, second and third acquisition signals; and
   wherein said processor includes means for obtaining first, second and third identity data from said first, second and third acquisition signals, respectively, said first, second and third identity data indicating whether said respective acquisition signal was broadcast from said primary system, said secondary system or said tertiary system; and
   wherein said transceiver additionally includes:
      means for refraining from communicating with said primary system, said means for refraining operating when said first and second identity data indicate that said first and second acquisition signals were broadcast from said primary and secondary systems, respectively,
      means for communicating with said tertiary system, said means for communicating operating when said third identity data indicates that said third acquisition signal was broadcast from said tertiary system, and
      means for sending a log-on message to said tertiary system over a communication channel identified by said third acquisition signal.

25. A subscriber unit as claimed in claim 24 wherein said transceiver includes means for communicating with said secondary system, said means for communicating with said secondary system operating when said processor obtains only said first and second identity data.

26. A subscriber unit as claimed in claim 24, wherein said processor includes means for selecting whether to communicate with said primary, secondary, or tertiary communication system, and said transceiver includes means for adjusting a transmit power level of said transceiver, said means for adjusting setting said transmit power level to a relatively low level when said tertiary communication system is selected, to a relatively medium level when said secondary communication system is selected, and to a relatively high level when said primary communication system is selected.

27. A subscriber unit as claimed in claim 24 wherein said processor includes means for selecting one of said communication systems with which to communicate and means for adjusting a power level at which said subscriber unit transmits, said means for selecting and means for adjusting operating in response to whether said primary, said secondary or said tertiary system is selected.

28. A subscriber unit as claimed in claim 24 wherein said processor includes means for determining whether communications are conducted with said primary or secondary system.

29. A subscriber unit for communicating with a primary and a subordinate communication system, said subordinate communication system cooperating with said primary communication system, said primary communication system projecting a plurality of cells on Earth, allocating orthogonal channels of a spectrum in adjacent ones of said cells, and reusing channels in geographically spaced apart cells, said primary communication system broadcasting a primary system acquisition channel that carries acquisition data that identifies said primary communication system and identifies a primary system communication channel with which to communicate, said subordinate communication system broadcasting a subordinate system acquisition channel that carries acquisition data that identifies said subordinate communication system and identifies a subordinate system communication channel with which to communicate, said subscriber unit comprising:
   a transceiver for synchronizing to said primary system acquisition channel and said subordinate system acquisition channel;
   a memory for saving data carried by said primary system acquisition channel and said subordinate system acquisition channel; and
   a processor for selecting either said primary or said subordinate communication system, said subordinate communication system being selected when said acquisition data from both said primary and subordinate communication systems is received, said primary communication system being selected when said acquisition data from only said primary communication system is received,
   wherein said transceiver has means for sending a log-on message to either said primary communication system over said primary system communication channel, or said subordinate communication system over said subordinate system communication channel specified by said acquisition data.

30. A subscriber unit as claimed in claim 29 wherein said processor includes means for selecting a second acquisition channel of either said primary or said subordinate communication system, said means for selecting operating when said transceiver unsuccessfully synchronizes to either said primary system or said subordinate system acquisition channel.

31. A subscriber unit as claimed in claim 29 wherein said data identifies channels for sending a message to said primary, said subordinate communication system and a tertiary communication system, said transceiver includes means for identifying all possible acquisition channels for said primary, subordinate and tertiary communication systems.

32. A subscriber unit as claimed in claim 31 wherein, said processor includes means for determining if one of said possible acquisition channels was broadcast from said tertiary system, and for selecting said tertiary system for communicating, and wherein said processor includes means for adjusting a power level of said transceiver to communicate with said tertiary system, said power level being adjusted to a low setting to minimize interference with said primary or subordinate communication systems.

33. A subscriber unit as claimed in claim 32 wherein said processor includes means for determining, when one of said possible acquisition channels was not broadcast from said tertiary system, if one of said possible acquisition channels was broadcast from said subordinate communication system, and for selecting said subordinate communication system for communication.

34. A subscriber unit as claimed in claim 29 wherein said processor includes means for selecting another one of said communication systems when said log-on message is unsuccessful, for adjusting a power level for said another one of said communication systems, and for tuning said transceiver to a channel specified by said another communication system.

35. A subscriber unit as claimed in claim 29 wherein said subscriber unit includes means for communicating on said subordinate communication system, and wherein said transceiver includes means for monitoring broadcast channels of said primary and subordinate communication systems and for switching from said subordinate communication system to said primary communication system when said subscriber unit moves out of range of said subordinate communication system.

36. A subscriber unit as claimed in claim 31 wherein said subscriber unit includes means for communicating on said tertiary communication system, and wherein said transceiver includes means for monitoring broadcast channels of said primary, said subordinate and said tertiary communication systems and means for switching from said tertiary communication system to said subordinate communication system when said subscriber unit moves out of range of said tertiary communication system.

37. A subscriber unit for communicating with a primary and a subordinate communication system, said subordinate communication system cooperating with said primary communication system, said primary communication system projecting a plurality of cells on Earth, allocating orthogonal channels of a spectrum in adjacent ones of said cells, and reusing channels in geographically spaced apart cells, either said primary or said subordinate communication system broadcasting an acquisition channel, said acquisition channel carrying acquisition data that identifies either said primary or said subordinate communication systems and identifies a communication channel to communicate with said primary or said subordinate communication systems, said subscriber unit comprising:

- a transceiver for synchronizing to said acquisition channel;
- a memory for saving said acquisition data carried by said acquisition channel; and
- a processor for selecting either said primary or said subordinate communication system,
- said transceiver sending a log-on message to either said primary or said subordinate communication system over said communication channel specified by said acquisition data, and wherein said subordinate communication system comprises:
- an antenna for projecting a secondary region over said Earth, wherein said secondary region and a local one of said cells occupy a common area;
- receiving means for receiving allocation data from said primary communication system, said allocation data identifying channels allocated by said primary communication system for use in said local cell;
- selecting means, coupled to said receiving means and said antenna, for selecting channels of said spectrum that are available for use in said secondary region; and
- means coupled to said receiving means, for tracking identities of said channels allocated by said primary communication system for use in said local cell as said local cell changes.

* * * * *

UNITED STATES PATENT AND TRADEMARK OFFICE
CERTIFICATE OF CORRECTION

PATENT NO. : 5,452,471
DATED : September 19, 1995
INVENTOR(S) : Raymond J. Leopold, Gregory Barton Vatt, William J. Zancho It is certified that error appears in the above-indentified patent and that said Letters Patent is hereby corrected as shown below:

In Claim 19, column 22, line 33, replace "of;" with --of:--.

In Claim 19, column 22, line 36, replace "signals;" with -- signals, --.

In Claim 19, column 22, line 39, replace "system:" with --system;--.

Signed and Sealed this

Thirtieth Day of January, 1996

Attest:

BRUCE LEHMAN

Attesting Officer

Commissioner of Patents and Trademarks